UNITED STATES PATENT OFFICE.

EMIL MEYER, OF ELBERFELD, GERMANY, ASSIGNOR TO FARBENFABRIKEN VORM. FRIEDR. BAYER & CO., OF ELBERFELD, GERMANY, A CORPORATION OF GERMANY.

RED TETRAZO DYE.

No. 888,522.

Specification of Letters Patent.

Patented May 26, 1908.

Application filed February 1, 1908. Serial No. 413,903.

*To all whom it may concern:*

Be it known that I, EMIL MEYER, chemist, citizen of the German Empire, residing at Elberfeld, Germany, Kingdom of Prussia, have invented new and useful Improvements in Red Tetrazo Dyes, of which the following is a specification.

My invention relates to the preparation of a new tetrazo-dyestuff which is obtained by combining one molecule of the tetrazo-compound of meta-dichlorobenzidin having the formula

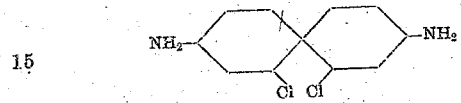

with two molecules of 2-naphthol-3.6-disulfonic acid. The new dye is after being dried and pulverized in the shape of its sodium salt a dark powder soluble in water with a red color and soluble in concentrated sulfuric acid with a red color. Upon reduction with stannous chlorid and hydrochloric acid meta-dichlorobenzidin and 1-amino-2-naphthol-3.6-disulfonic acid are obtained. It dyes wool red shades remarkable for fastness to light and to milling.

In carrying out my invention practically I can proceed as follows, the parts being by weight: 253 parts of meta-dichlorobenzidin are diazotized in the usual manner by means of 13.8 parts of sodium nitrite and the necessary quantity of hydrochloric acid; the resulting tetrazo-compound is then introduced into a well cooled solution containing 608 parts of 2-naphthol-3.6-disulfonic acid and an excess of sodium carbonate. The formation of the dye is complete after a short time. The dyestuff is precipitated by the addition of common salt, filtered off and dried.

Having now described my invention and in what manner the same is to be performed, what I claim as new and desire to secure by Letters Patent is:—

The herein described new tetrazo-dyestuff obtainable by combining the tetrazo-compound of meta-dichlorobenzidin having the formula:

with two molecules of 2-naphthol-3.6-disulfonic acid, which dyestuff is after being dried and pulverized in the shape of its sodium salt a dark powder soluble in water with a red color and soluble in concentrated sulfuric acid with a red color; yielding upon reduction with stannous chlorid and hydrochloric acid meta-dichlorobenzidin and 1-amino-2-naphthol-3.6-disulfonic acid; and dyeing wool from acid baths red shades, substantially as hereinbefore described.

In testimony whereof I have hereunto set my hand in the presence of two subscribing witnesses.

EMIL MEYER.

Witnesses:
OTTO KÖNIG,
WM. WASHINGTON BRUNSWICK.